Feb. 28, 1928.
E. NESTLER
MOLD
Filed Dec. 4, 1924
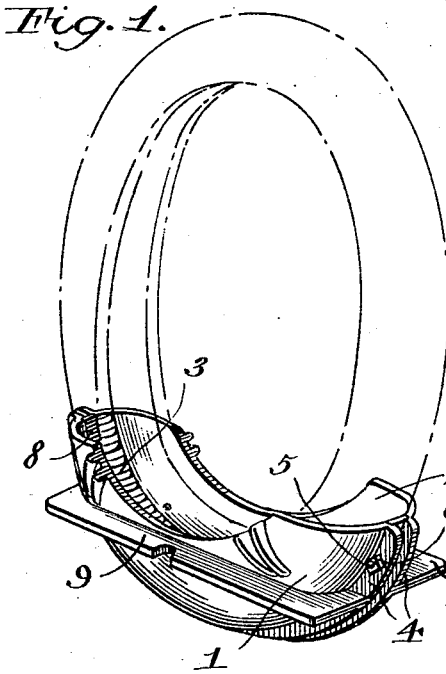
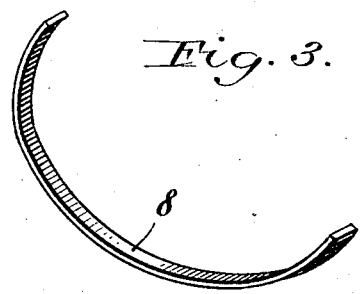
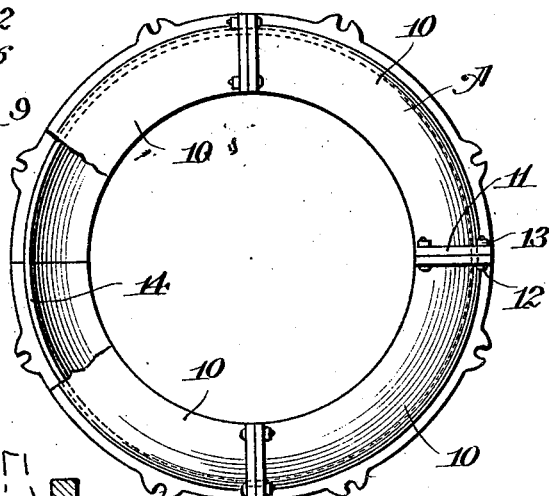
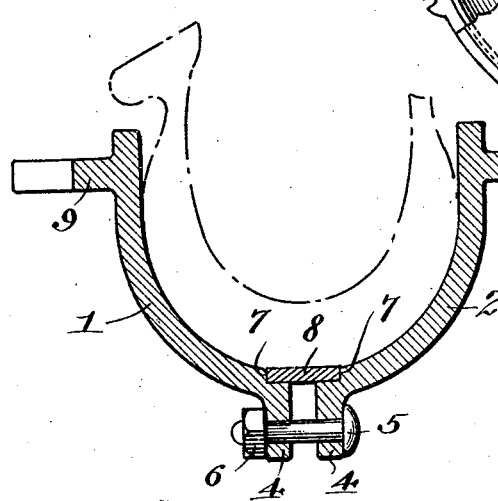
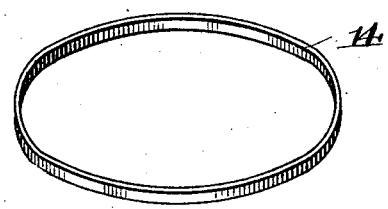
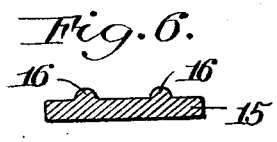
INVENTOR,
Emil Nestler.
BY
ATTORNEYS.

Patented Feb. 28, 1928.

1,660,653

UNITED STATES PATENT OFFICE.

EMIL NESTLER, OF NEW YORK, N. Y., ASSIGNOR TO NESTLER RUBBER FUSING CO., INC., OF NEW YORK, N. Y., A CORPORATION OF NEW YORK.

MOLD.

Application filed December 4, 1924. Serial No. 753,977.

This invention relates to molds and more particularly to tire molds for use in retreading tire shoes, an object of the invention being to provide a mold in which the tire or shoe can be securely held and a new tread fused to the old tire or shoe.

A further object is to provide a mold which may be made any desired size transversely by the insertion of strips which I term "mold centers." In other words, a mold may be made to accommodate any desired width of tire by inserting the proper width of center, and the sections of the mold with the center therein can be effectually clamped together so as to properly hold the tire and give to it the desired surface or tread, contour or ornamentation.

A further object is to provide an improved construction of mold which is especially adapted for use in connection with my improved clamp and steamless curing cabinet which form the subjects matter of separate applications Serial Nos. 753,976 and 753,978, respectively.

With these and other objects in view, the invention consists in certain novel features of construction and combinations and arrangements of parts which will be more fully hereinafter described and pointed out in the claims.

In the accompanying drawings—

Figure 1 is a perspective view of my improved sectional mold showing the position of the tire therein;

Figure 2 is a view in transverse section through the center of the mold shown in Figure 1;

Figure 3 is a perspective view of a mold center;

Figure 4 is a plan view partly broken away illustrating my invention as embodied in the complete mold;

Figure 5 is a perspective view of a ring center such as may be employed in the mold illustrated in Figure 4;

Figure 6 is a view in transverse section through a modified form of mold center.

Referring more particularly to Figures 1, 2 and 3, 1 and 2 represent the two halves of the sectional mold. This mold is adapted to receive a portion only of the tire, and while it may receive any desired portion of the tire I preferably construct the same to receive one-fourth of the tire so that in completing the retreading of the tire it is necessary to give or impart four operations to the tire, a fourth of the tire being treated at each time. In other words, after one section of the tire is treated it is removed and given a quarter of a turn and then replaced in the mold, and this operation is repeated until the entire surface of the tire has been treated and the tire or shoe completely retreaded.

The mold sections 1 and 2 are of proper cross sectional shape to conform to the shape of the tire or shoe and may be given any desired internal contour, as indicated at 3, to give the tread of the shoe the desired surface formation. The mold members 1 and 2 are formed externally at their inner edges with flanges 4 for the reception of bolts 5 and nuts 6 to clamp the mold members together. The mold members 1 and 2 on their inner faces at their adjacent edges are formed with recesses 7 in which my improved mold center 8 may be located and lie substantially flush with the inner face of the mold.

This mold center comprises a strip of metal conforming in length to the length of the mold and of such shape as to fit the recesses 7 and be securely clamped by the bolts 5 and 6. The mold center may be plain or smooth or it may have any desired contour, and it will be readily seen that by substituting a narrower or wider center the width of the mold as a whole can be varied to suit any width of tire or shoe.

The mold members 1 and 2 are provided at opposite sides with relatively straight and normally horizontal webs 9 which serve as supports to the mold and as partial top plates for a heater or cabinet such as set forth in my copending application above referred to.

In the use of this sectional mold, the shoe or tire is supplied with the necessary thickness of rubber in accordance with my improved process, and then placed in the mold and secured by clamps which form the subject matter of my co-pending application above referred to. While the tire is thus held it is subjected to dry heat at the proper temperature for the desired length of time so that the rubber of the shoe is completely fused and the proper surface given to the shoe. When this section of the shoe is treated it is removed and turned to present another one-quarter of the shoe to the mold, and the operation is repeated until the entire surface of the shoe is formed.

In the modification illustrated in Figures 4 and 5 I show my invention in connection with a complete mold A. This mold is made up of a circular series of sections 10 and while I have shown four of these sections it is obvious that the invention is not limited to any particular number.

These sections 10 are provided with flanges 11 at their ends secured by bolts 12 and nuts 13, and within the complete mold a ring center 14 is provided which gives to the mold the desired width and performs a function precisely like that of the mold center above described except that it is a complete ring.

The operation of this modified form of mold is precisely like that of the preferred form except that the tire is treated by a single operation rather than by a succession of operations.

In Figure 6 I illustrate the cross section of a modified form of mold 15, having projected portions 16 therein to provide recesses in the tread of the tire, and it is obvious that by shaping the ring centers and the interior of the mold any desired surface contour or ornamentation may be given to the shoe or tire.

Various slight changes and alterations might be made in the general form of the parts described without departing from my invention, and hence I do not limit myself to the precise details set forth but consider myself at liberty to make such slight changes and alterations as fairly fall within the spirit and scope of the appended claims.

I claim:

1. A tire mold of the character described, including a pair of sections spaced apart and having recesses in their mold faces at their inner edges, and a strip held in said recesses and having its inner face concentric with the inner faces of the mold face and constituting a portion of the mold face.

2. A tire mold of the character described, including an annular series of spaced sections, all of the sections having grooves or recesses at their inner edges, a strip located in said grooves or recesses, and means securing the sections together and clamping the strip in place, said strip having its inner face concentric with the inner faces of the sections and constituting a portion of the mold face formed by said sections.

EMIL NESTLER.